United States Patent [19]

Lee et al.

[11] Patent Number: 5,254,888
[45] Date of Patent: Oct. 19, 1993

[54] SWITCHABLE CLOCK CIRCUIT FOR MICROPROCESSORS TO THEREBY SAVE POWER

[75] Inventors: Robert H. J. Lee, Palo Alto; John D. Kenny, Sunnyvale, both of Calif.

[73] Assignee: Picopower Technology Inc., San Jose, Calif.

[21] Appl. No.: 858,834

[22] Filed: Mar. 27, 1992

[51] Int. Cl.⁵ ............................................. H03R 19/003
[52] U.S. Cl. .................................... 307/480; 307/243; 307/443
[58] Field of Search ................ 307/443, 269, 480–481, 307/243, 272.2

[56] References Cited

U.S. PATENT DOCUMENTS

| | | | |
|---|---|---|---|
| 4,570,219 | 2/1986 | Shibukawa et al. | 395/775 |
| 4,835,681 | 5/1989 | Culley | 395/575 X |
| 4,855,615 | 8/1989 | Humpleman | 307/480 X |
| 4,965,524 | 10/1990 | Patchen | 307/243 X |
| 5,155,380 | 10/1992 | Hwang et al. | 307/269 |

*Primary Examiner*—David R. Hudspeth
*Attorney, Agent, or Firm*—Oblon, Spivak, McClelland, Maier & Neustadt

[57] ABSTRACT

Power dissipation of a CMOS circuit such as a microprocessor is reduced by dynamically slowing down the microprocessor clock during selected system operations such as hold, wait, or AT peripheral bus access cycles. The microprocessor clock is slowed to its minimum allowable frequency with precise synchronous control to maintain the accuracy of high frequency clock edges and to prevent glitches or substandard pulse widths.

4 Claims, 2 Drawing Sheets

SWITCHABLE CLOCK CIRCUIT FOR MICROPROCESSORS TO THEREBY SAVE POWER

FIELD OF THE INVENTION

This invention relates to CMOS logic and memory circuits and in particular to such circuits used in microprocessors or the like which operate at low power but high frequency and to a method or methods of operating such circuits at low power and high effective frequency.

BACKGROUND OF THE INVENTION

In many high performance microprocessor-based computer systems, the computer system clock speed is usually much faster than various system cycle times, such as hold cycles, and memory cycles. This is especially a problem with a computer system architecture such as that of the IBM PC-AT for instance when it accesses the relatively slow peripheral bus. (Such accesses are referred to herein as "AT cycles.") During such relatively slow cycle types, the CPU (the microprocessor) has conventionally been held in a wait state with the CPU clock still operating at the same (high) speed. The problem with this is that in CMOS circuits (such as a microprocessor), power dissipation is directly proportional to the clock frequency. Thereby this mode of operation wastes precious power (particularly in battery operated computer systems) to keep the CPU running at full speed while the CPU is being held in a wait state, since the CPU clocking performs no useful function at this time. A CPU such as the Intel 486 microprocessor dissipates approximately 4 watts of power at 33 MHz operating frequency.

SUMMARY OF THE INVENTION

To reduce this power dissipation, the present invention dynamically slows down the CPU clock during selected operations such as HLDA (hold), CPUWAIT (wait), and ATCYCLE (selected IBM PC-AT cycles). The CPU clock is slowed to its minimum allowable frequency with precise synchronous control to maintain the accuracy of high frequency clock edges and to prevent glitches or substandard pulse widths. For example, during an ATCYCLE, if the CPU clock is dynamically slowed to 2 MHz, the result is a reduction in power dissipation to ¼ watt from the 4 watts at 33 MHz. This dynamic slowing of the CPU clock significantly reduces the overall average power dissipation without reducing system performance. This power savings in turn significantly reduces system heat generation and increases battery and system life. This invention will be more fully understood in conjunction with the following detailed description, taken together with the drawings.

DETAILED DESCRIPTION

Figure 1:
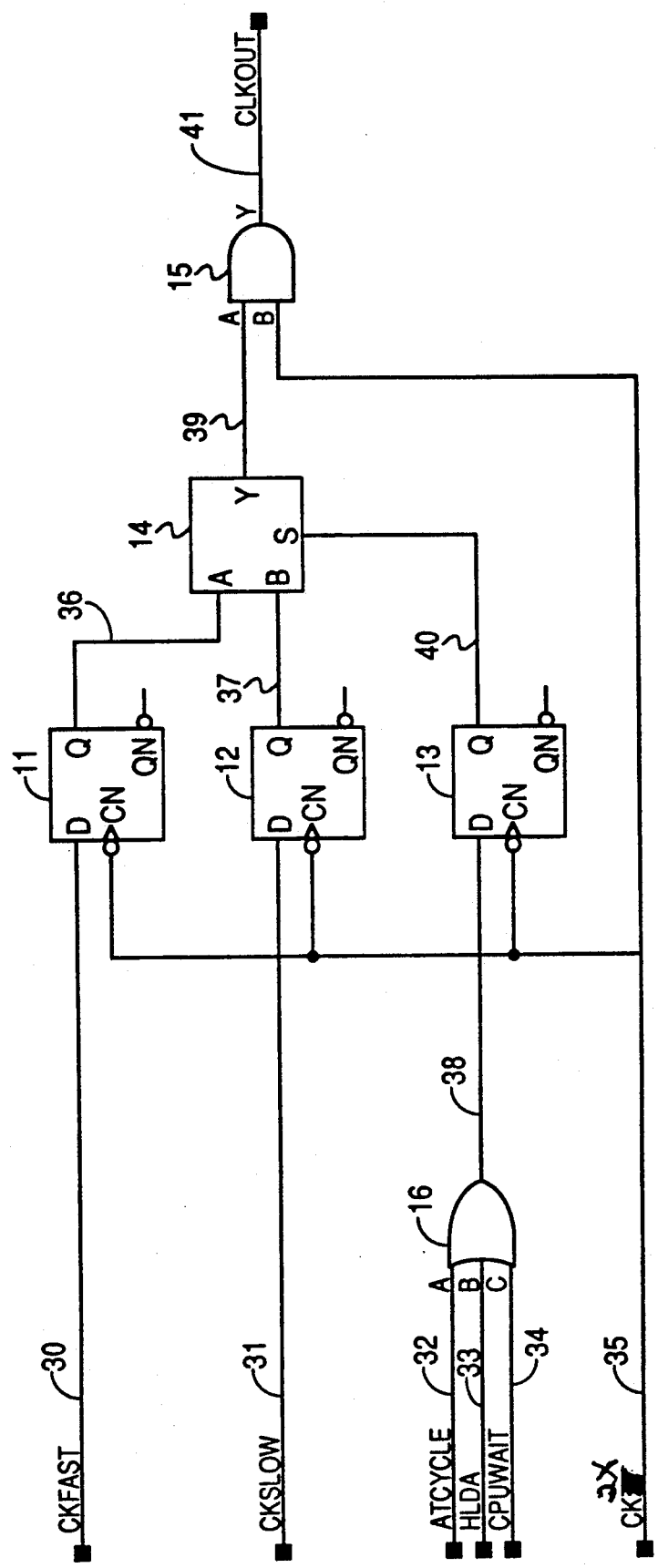
FIG. 1 illustrates the circuitry of this invention to reduce the frequency of operation of a CMOS circuit such as a microprocessor during certain operations.

As shown in FIG. 1, the present invention comprises three negative edge triggered D flip-flop's (DFF's), 11, 12, and 13. All three D flip-flops 11, 12 and 13 are clocked by the same clock signal CK2X on lead 35. The data input D of the first D flip-flop 11 is connected to input terminal 30 on which a control signal CKFAST is transmitted to flip-flop 11. Signal CKFAST (shown in FIG. 2) is a pulse enable control signal that will be high for twice the width of the CK2X positive pulse (also shown in FIG. 2) and will overextend both ends of every other pulse in the CK2X signal to prevent glitching or pulse width distortion when the two signals (CKFAST and CK2X) are logically AND'd together.

The data input terminal D of the second D flip-flop 12 is connected to an input terminal 31 which carries the signal CKSLOW. Signal CKSLOW (also shown in FIG. 2) is another pulse enable control signal similar to CKFAST except that CKSLOW will have many fewer enable pulses than CKFAST. The data input terminal D of the third D flip-flop 13 is connected to the output terminal 38 of OR gate 16. D flip-flop 13 selects (via multiplexer 14) the fast versus the slow clock signals on leads 30 and 31 respectively for use in driving the microprocessor system.

Figure 2:
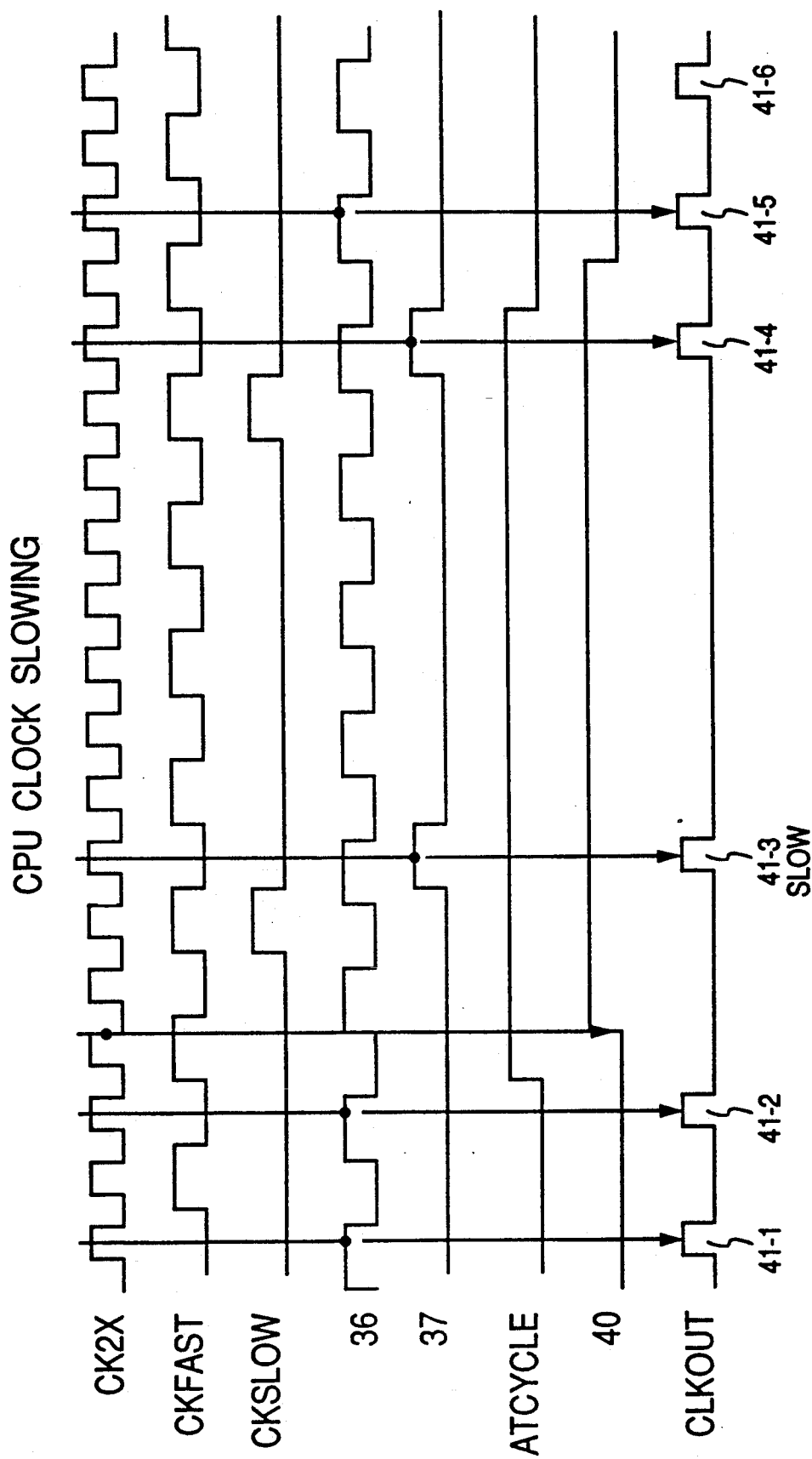
FIG. 2 illustrates the waveforms associated with the operation of the circuit shown in FIG. 1.

The output signals from D flip-flops 11 and 12 are transmitted on leads 36 and 37 to inputs A and B, respectively, of multiplexer 14. Multiplexer 14 is set by a signal on output lead 40 from D flip-flop 13. When the signal on lead 40 from D flip-flop 13 is high (as shown in FIG. 2) then multiplexer 14 transmits the slow clock signal on output terminal 37 from D flip-flop 12 to the B input terminal of multiplexer 14 and transmits the pulse 41-3 on the output terminal 41 as part of the CLKOUT signal. When the output signal from D flip-flop 13 is low, then the signal on output terminal 36 from D flip-flop 11 (which corresponds in frequency to the CKFAST signal on input lead 30 is transmitted on lead 36 through input terminal A of multiplexer 14 to output terminal 39 of multiplexer 14. This signal then is transmitted through AND gate 15 when the signal CK2X on lead 35, which is connected to the B input lead of AND gate 15, is high, thus creating on output lead 41 a high frequency CLKOUT signal represented by pulses 41-1, 41-2, 41-5 and 41-6 as shown in FIG. 2. Note that, in this example, the frequency of CLKOUT during the low output signal on lead 40 from D flip-flop 13 is one-half the frequency of the clock signal CK2X on lead 35. It should also be noted, however, that "CLKOUT" could be made equal to the CK2X frequency simply by keeping "CKFAST" high rather than toggling it.

All three D flip-flops 11, 12 and 13 are clocked on the low-going edge of the input clock signal CK2X. Consequently, the CLKOUT signal on terminal 41 will be held low for the next half cycle of signal CK2X such that any propagation delays through the D flip-flops 11, 12 and 13 and MUX 14 Will be settled out on terminal 39 before CK2X returns high. This ensures the consistent accuracy of the CLKOUT pulse width on output terminal 41 even while the CLKOUT signal on terminal 41 is dynamically switching back and forth between the slow and fast frequencies.

The circuit in FIG. 1 also includes a three input OR gate 16. The three input leads 32, 33 and 34 of OR gate 16 carry the control signals ATCYCLE, HLDA and CPUWAIT, respectively, each of which indicate that the CPU is in a slow cycle such that the CPU clock signal CLKOUT can be slowed down without degrading overall speed of performance of an instruction but at the same time saving significant power.

When the signals on all three input leads 32, 33 and 34 are low, the output signal on output terminal 38 of OR gate 16 is low and therefore the output signal on output terminal 39 of multiplexer 14 will be the same frequency as the signal on output lead 36 of D flip-flop 11, which is at the same frequency as the fast clock signal CKFAST 30.

When any of the three input signals on leads 32, 33 and 34 are high, the output signal from OR gate 16 on lead 38 goes high, thereby causing the output signal on terminal 40 from D flip-flop 13 to go high on the low-going edge of the next clock pulse generated by clock signal CK2X on lead 35. The high signal on lead 40 from D flip-flop 13 activates multiplexer 14 to transmit the input signal on lead 37 connected to the B input of multiplexer 14 to output terminal 39 from multiplexer 14. The signal on lead 39 will be the same as the signal on lead 37 connected to the output lead from the D flip-flop 12, and which selects the slow clock signal CKSLOW for transmission to output lead 41.

The circuit also uses a two input AND gate 15. The output signal of the multiplexer 14 on lead 39, which is effectively a pulse-by-pulse enable, is AND'd with the clock signal CK2X on lead 35, to select or deselect each positive pulse of the CK2X input. The selected pulses are transmitted on output lead 41 as output signal CLKOUT which is used to drive the microprocessor (CPU) or appropriate logic circuit.

While the signals CKFAST and CKSLOW are generated in a well-known manner using standard clock generating circuits, these signals can be generated either on the CPU chip itself or on other integrated circuit chips used with the CPU. While the signals ACTCYCLE, HLDA and CPUWAIT are shown as instituting the use of the slow clock signal to drive the CPU or other logic circuit, of course other signals or events could also be used to generate a slow clock output signal as appropriate. The minimum frequency of the slow clock output signal CKSLOW is controlled only by the minimum frequency at which the CPU can be operated so as to not lose information or encounter timing problems and glitches. Naturally, to the extent the logic circuitry requires refresh, the minimum frequency of the circuitry must be such as to enable the circuit to be refreshed sufficiently often to prevent the loss of information.

The operation of the clock slowing circuit described in FIG. 1 in conjunction with the wave forms of FIG. 2 is unique at least in that the output signal during either the fast or slow clock phase of operation is synchronized to the overall system clock denoted CK2X on lead 35. Thus, even though the system is switching from high speed to low speed in a random manner, depending upon the presence of one or more control signals on input leads 32, 33 or 34 to OR gate 16, the clock signal CK2X on lead 35, together with D flip-flops 11, 12 and 13 effectively synchronizes the transmission of the fast and slow clock signals on leads 30 and 31, respectively, to the output lead 39 from multiplexer 14. In addition, clock signal CK2X on lead 35 synchronizes the passage of the signal on lead 39 through AND gate 15 to the output lead 41. Accordingly, any delay in the arrival of the signal due to settling time or other system glitches is compensated for. Note that the "CLKOUT" signal can range in frequency from that equal to the "CK2X" input clock all the way down to a completely static condition (stopped).

In a typical application, the circuit of FIG. 1 would be included in a chipset which interfaces to the clock terminal of the microprocessor.

While this invention has been described in conjunction with one embodiment, other embodiments of this invention will be obvious to those skilled in the art.

What is claimed is:

1. A clock circuit for use in providing a clock signal to a logic circuit, said clock circuit comprising:
    means for generating a first clock signal suitable for driving the logic circuit;
    means for generating a second clock signal suitable for driving the logic circuit, said second clock signal having a frequency lower than that of said first clock signal;
    multiplexer means having at least two input leads, a first of said input leads for receiving said first clock signal and a second input lead for receiving said second clock signal responsive to a control signal, for selecting either said first clock signal or said second clock signal for transmission to said logic circuit to drive said logic circuit;
    an output lead connected to said multiplexer means;
    means for controlling the state of said multiplexer means to transmit to said output lead said first clock signal in the absence of said control signal and said second clock signal in the presence of said control signal;
    means for detecting the presence of said control signal, wherein said means for detecting the presence of said control signal comprises:
        a first logic gate capable of receiving a plurality of input signals, said first logic gate producing a output signal having a first state in response to any one of said plurality of input signals indicating that the second clock signal should be utilized; and
        means responsive to said output signal having a first state for providing said second clock signal to said logic circuit in response to any one of said plurality of control signals indicating that the second clock signal should be utilized.

2. Structure as in claim 1 wherein said means for providing comprises:
    a first flip-flop including an input lead for receiving said first clock signal and an output lead for transmitting a replica of said first clock signal to the first input lead of said multiplexer;
    a second flip-flop including an input lead for receiving said second clock signal and an output lead for transmitting a replica of said second clock signal to the second input lead of said multiplexer;
    a third flip-flop including an input lead for receiving said output signal having a first state from said logic gate and an output lead for transmitting a control signal derived from said output signal having a first state to the select input of said multiplexer; and
    a source of a clock signal, said clock signal being used to clock said first flip-flop, said second flip-flop and said third flip-flop to generate on the output lead from each of the three flip-flops a replica of the signal on the input lead to each of the three flip-flops.

3. Structure as in claim 2, including means for transmitting the output signal from said multiplexer to the output lead from said timing circuit in a manner synchronized with said clock signal.

4. Structure as in claim 3 wherein said means for transmitting the output signal from said multiplexer to the logic circuit in a manner synchronized with said clock signal comprises:

an AND gate having a first input lead connected to the output lead from said multiplexer;

a second input lead connected to receive said clock signal; and an output lead upon which the signal from said multiplexer is transmitted to said logic circuit when the clock signal and the signal on the output lead from the multiplexer are both in a selected state.

* * * * *